US009466188B2

(12) United States Patent
Hamam et al.

(10) Patent No.: US 9,466,188 B2
(45) Date of Patent: Oct. 11, 2016

(54) SYSTEMS AND METHODS FOR HAPTICALLY-ENABLED ALARMS

(71) Applicant: Immersion Corporation, San Jose, CA (US)

(72) Inventors: Abdelwahab Hamam, Montreal (CA); Razmik Mousakhanian, Kirkland (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/582,503

(22) Filed: Dec. 24, 2014

(65) Prior Publication Data

US 2016/0189492 A1     Jun. 30, 2016

(51) Int. Cl.
*H04B 3/36* (2006.01)
*G08B 6/00* (2006.01)

(52) U.S. Cl.
CPC ...................................... *G08B 6/00* (2013.01)

(58) Field of Classification Search
CPC .. G06F 3/016; G06F 1/163; H04M 2250/12; G08B 6/00
USPC ...................................................... 340/407.1
See application file for complete search history.

(56) References Cited

U.S. PATENT DOCUMENTS

| 8,902,050 | B2 | 12/2014 | Heubel et al. | |
|---|---|---|---|---|
| 2003/0067440 | A1* | 4/2003 | Rank | G06F 3/016 345/156 |
| 2011/0128132 | A1* | 6/2011 | Ullrich | G06F 3/16 340/407.1 |
| 2012/0062371 | A1 | 3/2012 | Radivojevic et al. | |
| 2013/0307786 | A1 | 11/2013 | Heubel | |
| 2014/0067128 | A1* | 3/2014 | Kowalski | G05B 19/409 700/264 |
| 2014/0266692 | A1 | 9/2014 | Freedman et al. | |
| 2015/0026647 | A1* | 1/2015 | Park | G06F 3/0488 715/863 |

FOREIGN PATENT DOCUMENTS

| EP | 1 505 550 | 2/2005 |
|---|---|---|
| EP | 2 763 000 | 8/2014 |

OTHER PUBLICATIONS

Safe Call Communications, web page at http://www.silentcall.com/, as available via the Internet and printed Dec. 15, 2014.
Smart Home, Safewake Smoke Alarm Aid Bed Shaker, web page at http://www.smarthome.com/safeawake-smoke-alarm-aid-bed-shaker.html, as available via the Internet and printed Dec. 15, 2014.
Bruck et al., Optimizing Fire Alarm Notifications for High Risk Groups Research Project: Waking Effectiveness of Alarms (auditory, visual and tactile) for Adults who are Hard of Hearing, The Fire Protection Research Foundation, Jun. 2007.
CPI Security Systems, CPI InTouch, webpage at https://cpisecurity.com/intouch/, as available via the Internet and printed May 4, 2016.
European Patent Office, Extended European Search Report, European Application No. 15202958 dated Jun. 1, 2016.

* cited by examiner

*Primary Examiner* — Don N Vo
(74) *Attorney, Agent, or Firm* — Kilpatrick Townsend & Stockton LLP (57) ABSTRACT

One illustrative computing device disclosed herein includes a processor configured to receive a signal from an alarm device, wherein the signal is associated with an event. The processor is also configured to determine a haptic effect associated with the signal and transmit a haptic signal associated with the haptic effect. The illustrative computing device also includes a haptic output device in communication with the processor. The haptic output device is configured to receive the haptic signal and output the haptic effect.

21 Claims, 4 Drawing Sheets

SYSTEMS AND METHODS FOR HAPTICALLY-ENABLED ALARMS

FIELD OF THE INVENTION

The present invention relates to the field of user interface devices. More specifically, the present invention relates to haptically-enabled alarms.

BACKGROUND

Alarm systems, such as burglar and fire alarms, typically depend on sounds or visual effects to notify users of an event. For example, a fire alarm may emit high-frequency sounds and flash a light upon detecting smoke or other indicia of a fire. Such alarm systems, however, can be inadequate for notifying hearing-impaired individuals and/or visually-impaired of events. Thus, there is a need for improved alarm systems. It may be desirable to improve alarm systems through the use of haptic feedback (e.g., mechanical vibrations).

SUMMARY

Embodiments of the present disclosure comprise haptically-enabled alarms. In one embodiment, a computing device of the present disclosure may comprise a processor configured to receive a signal from an alarm device, wherein the signal is associated with an event. The processor may also be configured to determine a haptic effect associated with the signal and transmit a haptic signal associated with the haptic effect. The computing device may also comprise a haptic output device in communication with the processor. The haptic output device may be configured to receive the haptic signal and output the haptic effect.

In another embodiment, a method of the present disclosure may comprise: receiving a signal from an alarm device, wherein the signal is associated with an event. The method may also comprise determining a haptic effect associated with the signal and transmitting a haptic signal associated with the haptic effect to a haptic output device. The haptic output device may be configured to receive the haptic signal and output the haptic effect. Yet another embodiment comprises a computer-readable medium for implementing such a method.

These illustrative embodiments are mentioned not to limit or define the limits of the present subject matter, but to provide examples to aid understanding thereof. Further embodiments are discussed in the Detailed Description, and additional description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations that come within the scope of the appended claims and their equivalents.

Illustrative Examples of Haptically-Enabled Alarms

One illustrative embodiment of the present disclosure comprises an alarm device. An alarm device may comprise any electronic device configured to output a notification to a user upon the occurrence of an event (e.g., detecting a fire, smoke, or a burglar, or determining a particular time of day). For example, in some embodiments, the alarm device comprises a smoke alarm, fire alarm, burglar alarm, an alarm clock, or an appliance (e.g., a dishwasher, toaster, refrigerator, oven, coffee maker, or a microwave).

In the illustrative embodiment, the alarm device is in wired or wireless communication with a notification device. The notification device is configured to receive a signal from the alarm device and output a haptic effect (e.g., a vibration, stroking sensation, texture, and/or stinging sensation) to a user. In some embodiments, the notification device is associated with a wearable device (e.g., a ring, bracelet, sleeve, collar, hat, shirt, glove, or glasses) and/or is coupled to the user's body.

In one example, upon detecting a fire, the alarm device transmits a signal to the notification device. In the illustrative embodiment, the notification device receives the signal and outputs a haptic effect (e.g., a vibration) to a portion of the user's body (e.g., the user's head, arm, hand, finger, wrist, leg, or foot). The haptic effect may notify the user of the fire, for example, if the user is hearing and/or visually impaired (e.g., due to a medical condition or for another reason, such as because the television is on, the radio is on, or the user is wearing headphones). In some embodiments, the haptic effect may notify the user of the fire when other methods of notification (e.g., sound and/or visuals) may be inadequate, for example, if the user is a heavy sleeper.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Haptically-Enabled Alarms

Figure 1:
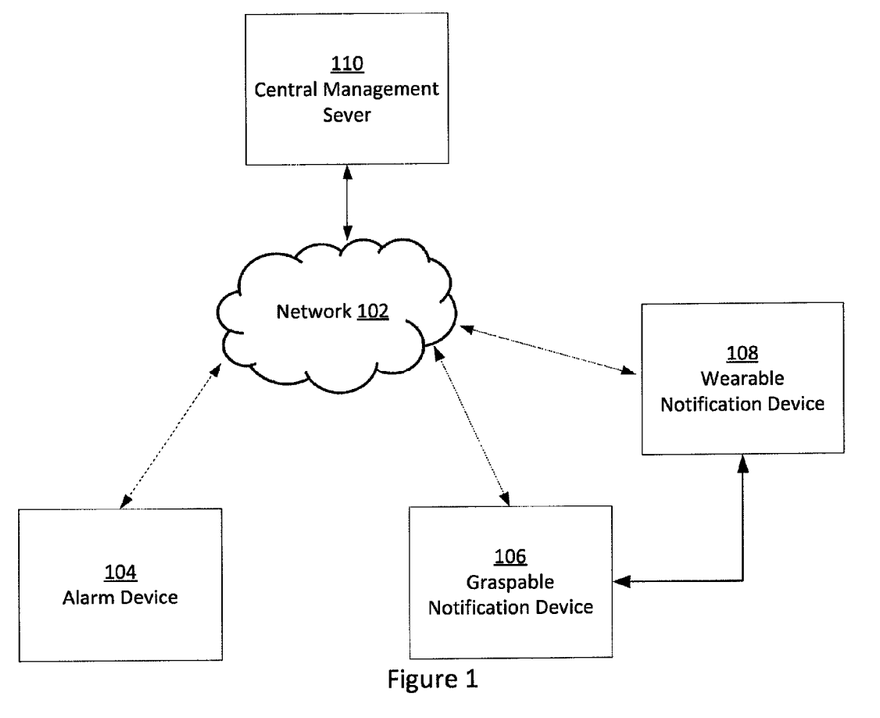
FIG. 1 is a block diagram showing a system for haptically-enabled alarms according to one embodiment.

FIG. 1 is a block diagram showing a system for haptically-enabled alarms according to one embodiment. The system may comprise one or more alarm devices 104 in wired or wireless communication with one or more notification devices 106, 108. In the embodiment shown in FIG.

1, the system comprises a graspable notification device 106, a wearable notification device 108, and an alarm device 104. A graspable notification device 106 may comprise a computing device that is associated with a graspable device (e.g., a mobile phone) that is configured to be grasped by the user. A wearable notification device 108 may comprise a computing device that is associated with a wearable device (e.g., a ring) that is configured to be worn by the user. An alarm device 104 may comprise a computing device (e.g., the computing device 201 described in FIG. 2) configured to output a notification to a user upon the occurrence of an event.

An event, as used herein, is any interaction, action, collision, or other event which occurs during operation of the alarm device which can potentially comprise an associated haptic effect. In some embodiments, an event may comprise receiving a signal from a sensor (e.g., a signal from a motion detector, such as for a burglar alarm), detecting the presence of fire, completing a particular task (e.g., a laundry cycle, a dishwashing cycle, preheating the oven, microwaving an object, brewing coffee or tea), detecting whether a temperature exceeds a threshold (e.g., detecting whether water is boiling, such as in a kettle, or toast is burning), a particular time occurring (e.g., midnight), and/or detecting an amount of a substance, such as a fluid (e.g., water, oil, or a gas, such as smoke, carbon monoxide, or carbon dioxide).

The alarm device 104 and notification devices 106, 108 may be connected to a network 102. The network 102 may be any suitable number or type of networks or links, including, but not limited to, a dial-up network, a local area network (LAN), wide area network (WAN), public switched telephone network (PSTN), a cellular network, a WiFi network, Bluetooth, the Internet, an intranet or any combination of hard-wired and/or wireless communication links. In some embodiments, the network 102 is a single network. In other embodiments, the network 102 may comprise two or more networks.

The alarm device 104 and notification devices 106, 108 may directly communicate with each other and/or may communicate with each other via the network 102. For example, graspable notification device 106 may communicate wirelessly with wearable notification device 108 (e.g., using Bluetooth). Further, the alarm device 104 and/or notification devices 106, 108 may communicate with one or more remote servers (e.g., cloud servers, webservers, or other servers), databases, and/or devices via the network 102.

As described above, the system may comprise an alarm device 104. In some embodiments, the alarm device 104 may comprise a smoke alarm, fire alarm, burglar alarm, an alarm clock, an appliance (e.g., a dishwasher, toaster, refrigerator, oven, coffee maker, mixer, refrigerator, or a microwave), and/or another electronic device (e.g., a television, tablet, e-reader, mobile device, or gaming system). The alarm device 104 may be configured to transmit a signal to a notification device 106, 108 upon the occurrence of an event. For example, if the alarm device 104 comprises a laundry machine, the alarm device 104 may transmit a signal to a notification device 106, 108 completing a laundry cycle. The signal may be configured to cause the notification device 106, 108 to output a haptic effect (e.g., a vibration). This may notify the user that the event occurred (e.g., that the laundry cycle finished).

As described above, the system may comprise a graspable notification device 106. The graspable notification device 106 may be associated with a hand-held or graspable device comprising, for example, a smartphone, tablet, e-reader, stylus, pen, and/or a portable gaming device. In some embodiments, the graspable notification device 106 is configured to receive a signal, e.g., from the alarm device 104. Based on the signal, the graspable notification device 106 may output a haptic effect, e.g., to the user's hand or other body part. For example, if the graspable notification device 106 is positioned in the user's pants pocket (or shirt pocket), the graspable notification device 106 may output a haptic effect to the user's thigh (or chest).

As described above, the system may comprise a wearable notification device 108. The wearable notification device 108 may comprise a computing device that is associated with a wearable device, for example, a ring, a shoe, an armband, a sleeve, a jacket, glasses, a glove, a watch, a wristband, a bracelet, an article of clothing, a hat, a headband, and/or jewelry. In some embodiments, the wearable notification device 108 is configured to receive a signal, e.g., from the alarm device 104. Based on the signal, the wearable notification device 108 may output a haptic effect to a body part of the user (e.g., the user's wrist, arm, leg, foot, hand, finger, neck, head, or chest). For example, the wearable notification device 108 may comprise a ring. Upon receiving a signal associated with an event from the alarm device 104, the wearable notification device 108 may output a vibration to the user's finger.

In some embodiments, the graspable notification device 106 may act as an intermediary between the alarm device 104 and the wearable notification device 106. For example, upon the occurrence of an event, the alarm device 104 (e.g., a fire alarm) may transmit a signal to the graspable notification device 106 (e.g., a smart phone), e.g., via the network 102. In some embodiments, the graspable notification device 106 may receive the signal and cause the wearable notification device 108 (e.g., a smart watch) to output a haptic effect. For example, the graspable notification device 106 may transmit a signal (e.g., via Bluetooth) to the wearable notification device 108 that is configured to cause the wearable notification device 108 to output a haptic effect. In this manner, the wearable notification device 108 may be able to output haptic effects to a user, even if the wearable notification device 108 is not in direct communication with the alarm device 104 and/or coupled to the network 102.

In some embodiments, one or more alarm devices 104 may transmit signals to a central management server 110. In some embodiments, the central management server 110 may comprise a local or remote server (e.g., with which the alarm device 104 may communicate over a LAN or the Internet). The central management server 110 may be configured to receive signals from one or more alarm devices 104 and, based on the signals, determine which notification devices 106, 108 to actuate. The central management server 110 may then transmit signals to the designated notification devices 106, 108. The signals may cause the designated notification devices 106, 108 to output haptic effects. Thus, the central management server 110 can act as an intermediary between one or more alarm devices 104 and one or more notification devices 106, 108.

Figure 2:
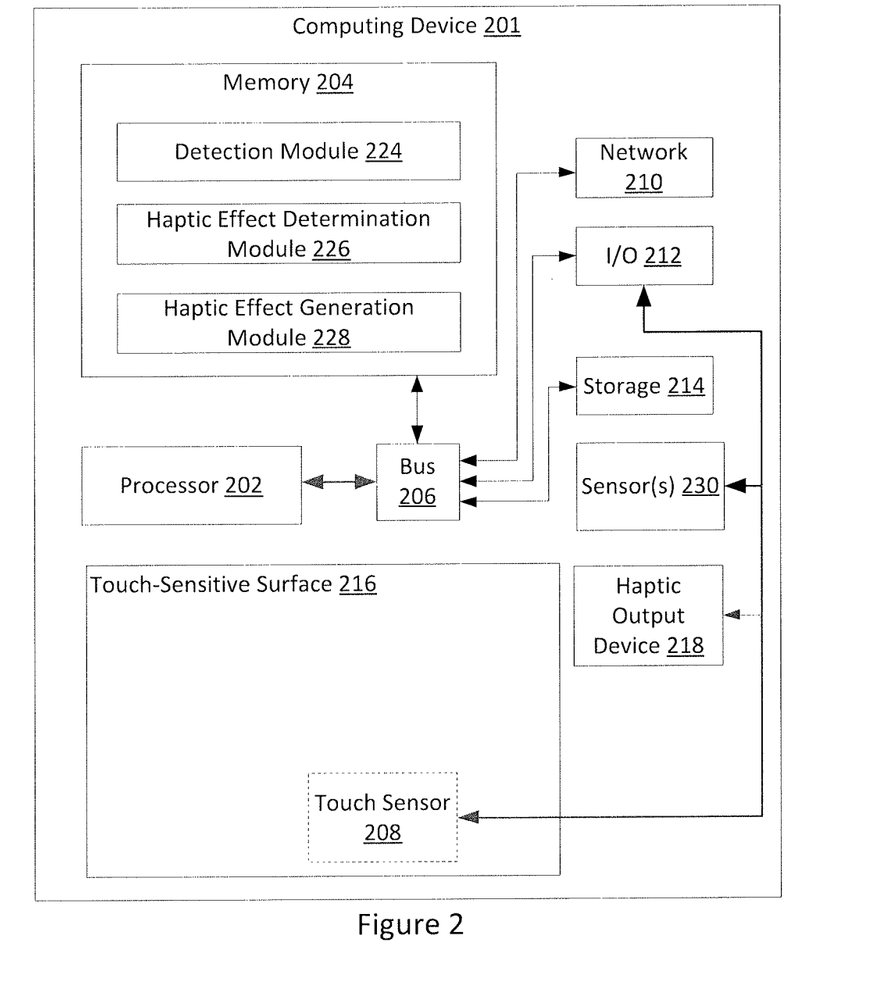
FIG. 2 is another block diagram showing a system for haptically-enabled alarms according to one embodiment.

FIG. 2 is another block diagram showing a system for haptically-enabled alarms according to one embodiment. In the embodiment shown, the system comprises a computing device 201. The computing device 201 may be representative of the computing devices associated with the alarm device 104 and/or notification devices 106, 108 described above with respect to FIG. 1.

In some embodiments, the components (e.g., the processor 202, network 210, touch-sensitive surface 216, sensor 230, etc.) of the computing device 201 may be integrated into a single housing. In other embodiments, the components may be distributed (e.g., among multiple housings or locations) and in electrical communication with one another. Further, in some embodiments, the computing device 201 may or may not comprise all of the components depicted in FIG. 2. For example, in some embodiments, the computing device 201 may only have the processor 202, bus 206, memory 204, network interface components 210, and haptic output device 218.

In the embodiment shown in FIG. 2, the computing device 201 comprises a processor 202 interfaced with other hardware via bus 206. A memory 204, which can comprise any suitable tangible (and non-transitory) computer-readable medium such as RAM, ROM, EEPROM, or the like, may embody program components that configure operation of the computing device 201. The computing device 201 may further comprise one or more network interface components 210, input/output (I/O) interface components 212, and additional storage 214.

Network interface components 210 can represent one or more of any components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

I/O components 212 may be used to facilitate connection to devices such as one or more displays, touch-sensitive surfaces 216, keyboards, mice, speakers, microphones, buttons, and/or other hardware used to input data or output data. Storage 214 represents nonvolatile storage such as read-only memory, flash memory, ferroelectric RAM (F-RAM), magnetic, optical, or other storage media included in the computing device 201 or coupled to processor 202.

The computing device 201 may comprise a touch-sensitive surface 216. Touch-sensitive surface 216 represents any surface that is configured to sense tactile input of a user. One or more touch sensors 208 are configured to detect a touch in a touch area (e.g., when an object contacts a touch-sensitive surface 216) and transmit signals associated with the touch to processor 202. Any suitable number, type, or arrangement of touch sensors 208 can be used. For example, resistive and/or capacitive sensors may be embedded in touch-sensitive surface 216 and used to determine the location of a touch and other information, such as pressure, speed, and/or direction. As another example, optical sensors with a view of the touch-sensitive surface 216 may be used to determine the touch position. As still another example, the touch-sensitive surface 216 may comprise a LED (Light Emitting Diode) finger detector mounted on the side of a display. In some embodiments, touch sensor 208 may be configured to detect multiple aspects of the user interaction. For example, touch sensor 208 may detect both the speed and pressure of a user interaction, and incorporate this information into the signal transmitted to the processor 202.

In some embodiments, the computing device 201 comprises a touch-enabled display that combines a touch-sensitive surface 216 and a display of the device. The touch-sensitive surface 216 may correspond to the display exterior or one or more layers of material above components of the display. In other embodiments, touch-sensitive surface 216 may not comprise (or otherwise correspond to) a display, depending on the particular configuration of the computing device 201.

The computing device 201 may further comprise one or more additional sensor(s) 230. The sensor(s) 230 are configured to transmit sensor signals to the processor 202. In some embodiments, the sensor 230 may comprise, for example, a humidity sensor, ambient light sensor, gyroscope, GPS unit, accelerometer, optical sensor, ionization sensor, opto-chemical sensor, biomimetic sensor, range sensor, depth sensor, biosensor, camera, switch, button, or temperature sensor. For example, the sensor 230 may comprise a temperature sensor. The temperature sensor may be configured to detect the ambient temperature in a room and transmit associated sensor signals to the processor 202. The processor 202 may receive the sensor signals and, for example, determine whether the temperature is above a threshold (e.g., which may be indicative of a fire). In some embodiments, the sensor 230 may be external to computing device 201 and in wired or wireless communication with the computing device 201.

The computing device 201 may comprise a haptic output device 218 in communication with processor 202. The haptic output device 218 is configured to output a haptic effect in response to a haptic signal. In some embodiments, the haptic output device 218 is configured to output a haptic effect comprising a vibration, a change in a perceived coefficient of friction, a simulated texture, a change in temperature, a stroking sensation, an electro-tactile effect, or a surface deformation (e.g., a deformation of a surface associated with the computing device 201). Further, some haptic effects may use multiple haptic output devices 218 of the same or different types in sequence and/or in concert. Although a single haptic output device 218 is shown in FIG. 2, embodiments may use multiple haptic output devices 218 of the same or different type to produce haptic effects.

In some embodiments, the haptic output device 218 is external to computing device 201 and in communication with the computing device 201 (e.g., via wired interfaces such as Ethernet, USB, IEEE 1394, and/or wireless interfaces such as IEEE 802.11, Bluetooth, or radio interfaces). For example, the haptic output device 218 may be associated with (e.g., coupled to) a wearable device and configured to receive haptic signals from the processor 202.

In some embodiments, the haptic output device 218 is configured to output a haptic effect comprising a vibration. The haptic output device 218 may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, the haptic output device 218 is configured to output a haptic effect modulating the perceived coefficient of friction of a surface associated with the haptic output device 218. In one embodiment, the haptic output device 218 comprises an ultrasonic actuator. An ultrasonic actuator may vibrate at an ultrasonic frequency, for example 20 kHz, increasing or reducing the perceived coefficient of friction of an associated surface. In some embodiments, the ultrasonic actuator may comprise a piezo-electric material.

In some embodiments, the haptic output device 218 uses electrostatic attraction, for example by use of an electrostatic actuator, to output a haptic effect. The haptic effect may comprise a simulated texture, a simulated vibration, a stroking sensation, or a perceived change in a coefficient of friction on a surface associated with the computing device 201. In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 202 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger, head, foot, arm, shoulder, leg, or other body part, or a stylus) near or touching the haptic output device 218. Varying the levels of attraction between the object and the conducting layer can vary the haptic effect perceived by a user.

In some embodiments, the haptic output device 218 comprises a deformation device configured to output a deformation haptic effect. The deformation haptic effect may comprise raising or lowering portions of a surface associated with the computing device 201. For example, the deformation haptic effect may comprise raising portions of the touch-sensitive surface 216 to generate a bumpy texture. In some embodiments, the deformation haptic effect may comprise bending, folding, rolling, twisting, squeezing, flexing, changing the shape of, or otherwise deforming a surface associated with the computing device 201. For example, the deformation haptic effect may apply a force on a surface associated with the computing device 201, causing it to bend, fold, roll, twist, squeeze, flex, change shape, or otherwise deform. For instance, if the computing device 201 comprises deformable mobile device (e.g., a deformable smart phone), the deformation haptic effect may comprise bending the deformable mobile device an amount (e.g., 30 degrees). This may notify the user that an event occurred (e.g., that the computing device 201 has detected smoke or another gas).

In some embodiments, the haptic output device 218 comprises fluid configured for outputting a deformation haptic effect (e.g., for bending or deforming a surface associated with the computing device 201). For example, the fluid may comprise a smart gel. A smart gel comprises a fluid with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. In some embodiments, stiffness may comprise the resistance of a surface associated with the computing device 201 against deformation. In some embodiments, one or more wires may be embedded in or coupled to the smart gel. As current runs through the wires, heat is emitted, causing the smart gel to expand or contract. This may cause a surface associated with the computing device 201 to deform.

As another example, the fluid may comprise a rheological (e.g., a magneto-rheological or electro-rheological) fluid. A rheological fluid comprises metal particles (e.g., iron particles) suspended in a fluid (e.g., oil or water). In response to an electric or magnetic field, the order of the molecules in the fluid may realign, changing the overall damping and/or viscosity of the fluid. This may cause a surface associated with the computing device 201 to deform.

In some embodiments, the haptic output device 218 comprises a mechanical deformation device. For example, in some embodiments, the haptic output device 218 may comprise an actuator coupled to an arm that rotates a deformation component. The deformation component may comprise, for example, an oval, starburst, or corrugated shape. The deformation component may be configured to move a surface associated with the computing device 201 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from a processor (e.g., processor 202), the actuator may rotate the deformation component. Rotating the deformation component may cause one or more portions of the surface to raise or lower. The deformation component may, in some embodiments, remain in this rotated state until a processor (e.g., processor 202) signals the actuator to rotate the deformation component back to its original position.

Further, other techniques or methods can be used to deform a surface associated with the computing device 201. For example, the haptic output device 218 may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory alloys). In some embodiments, the haptic output device 218 is deformed, for example, with a deforming mechanism (e.g., a motor coupled to wires), air or fluid pockets, local deformation of materials, resonant mechanical elements, piezoelectric materials, micro-electromechanical systems ("MEMS") elements or pumps, thermal fluid pockets, variable porosity membranes, or laminar flow modulation.

In some embodiments, the haptic output device 218 may be a portion of the housing of the computing device 201. In other embodiments, the haptic output device 218 may be housed inside a flexible housing overlaying a surface associated with the computing device 201 (e.g., the front or back of the computing device 201). For example, the computing device 201 may comprise a watch. The haptic output device 218 may comprise a layer of smart gel overlaying the interior of the band of the watch. Upon actuating the haptic output device 218 (e.g., with an electric current or an electric field), the smart gel may expand. This may cause the user to perceive a haptic effect comprising a squeezing sensation around the user's wrist.

Turning to memory 204, program components 224, 226, and 228 are depicted to show how a device can be configured in some embodiments to provide haptically-enabled alarms. In this example, a detection module 224 configures the processor 202 to monitor the touch-sensitive surface 216 via touch sensor 208 to determine a position of a touch. For example, detection module 224 may sample the touch sensor 208 in order to track the presence or absence of a touch and, if a touch is present, to track one or more of the location, path, velocity, acceleration, pressure and/or other characteristics of the touch over time. Although the detection module 224 is depicted in FIG. 2 as a program component within the memory 204, in some embodiments, the detection module 224 may comprise hardware configured to monitor the touch-sensitive surface 216 to detect a touch. In some embodiments, such hardware may comprise analog to digital converters, processors, microcontrollers, comparators, amplifiers, transistors, and other analog or digital circuitry.

Haptic effect determination module 226 represents a program component that analyzes data to determine a haptic effect to generate. In some embodiments, haptic effect determination module 226 may comprise code that determines a haptic effect to output based on a characteristic (e.g., the type, severity, or time) of an event. The haptic effect determination module 226 may comprise code that selects one or more haptic effects to output. For example, in some embodiments, different events (e.g., detecting an intruder, a fire, a gas, or a particular time occurring) may be mapped to different haptic effects (e.g., a high-magnitude vibration, a high-frequency vibration, a stinging sensation, and a pulsed vibration). Haptic effect determination module 226 may select a haptic effect based on the event.

In some embodiments, the haptic effect determination module 226 may select the haptic effect based on a user's "haptic profile." The memory 204 may store "haptic profiles" in which a user can input a "profile" of the haptic effects the user would like associated with particular events. For example, in one embodiment, a user can select from a list of options which haptic effect the user would like associated with events comprising a toaster detecting that food (e.g., toast) is burning, a timer (e.g., an oven or microwave timer) finishing a countdown, an alarm clock going off, or a burglar alarm. In some embodiments, the list may comprise, for example, haptic effects such as high-magnitude vibration, pulsed vibration, high-frequency vibration, or a stinging sensation. In one embodiment, the user's haptic profile may associate an event comprising detecting the end of a laundry cycle with a haptic effect comprising a low-magnitude vibration. In such an embodiment, if a laundry cycle ends, the haptic effect determination module 226 may consult the user's haptic profile and determine a haptic effect comprising a low-magnitude vibration.

In some embodiments, haptic effect determination module 226 may comprise code that determines a haptic effect based on a characteristic (e.g., the type or location) of the computing device 201 associated with the event. For example, if the location of the computing device 201 is near the user's bedroom (e.g., and the event comprises detecting carbon monoxide), the haptic effect determination module 226 may determine a haptic effect comprising a high-magnitude vibration. If the location of the computing device 201 is in the basement of the user's home (e.g., and the event comprises detecting carbon monoxide), the haptic effect determination module 226 may determine a haptic effect comprising a medium-magnitude vibration.

Although the haptic effect determination module 226 is depicted in FIG. 2 as a program component within the memory 204, in some embodiments, the haptic effect determination module 226 may comprise hardware configured to determine one or more haptic effects to generate. In some embodiments, such hardware may comprise analog to digital converters, processors, microcontrollers, comparators, amplifiers, transistors, and other analog or digital circuitry.

Haptic effect generation module 228 represents programming that causes processor 202 to generate and transmit haptic signals to a haptic output device 218 (e.g., associated with the computing device 201) to generate the selected haptic effect. For example, the haptic effect generation module 228 may access stored waveforms or commands to send to the haptic output device 218 to create the desired effect. In some embodiments, the haptic effect generation module 228 may comprise algorithms to determine the haptic signal. Further, in some embodiments, haptic effect generation module 228 may comprise algorithms to determine target coordinates for the haptic effect (e.g., coordinates for a location on the touch-sensitive surface 216 at which to output a haptic effect).

Although the haptic effect generation module 228 is depicted in FIG. 2 as a program component within the memory 204, in some embodiments, the haptic effect generation module 228 may comprise hardware configured to determine one or more haptic effects to generate. In some embodiments, such hardware may comprise analog to digital converters, processors, microcontrollers, comparators, amplifiers, transistors, and other analog or digital circuitry.

Figure 3:
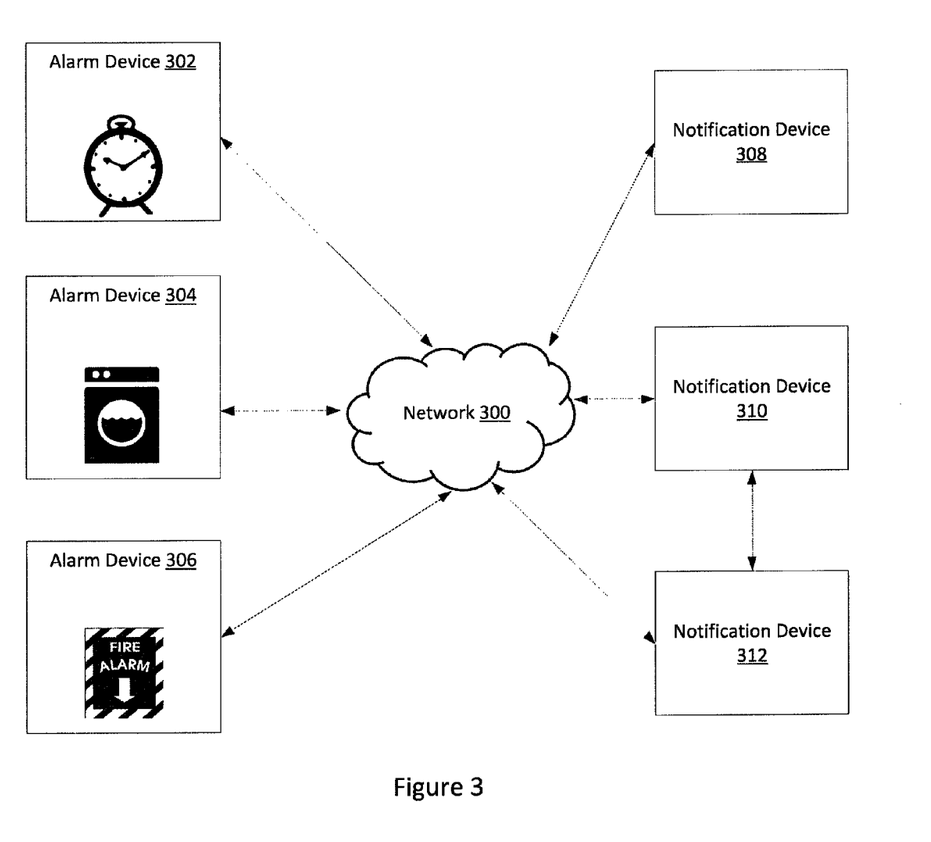
FIG. 3 shows an embodiment of a system for haptically-enabled alarms.

FIG. 3 shows an embodiment of a system for haptically-enabled alarms. The system comprises a plurality of alarm devices 302, 304, 306 and a plurality of notification devices 308, 310, 312. The plurality of alarm devices 302, 304, 306 may be in wired or wireless communication with one or more of the plurality of notification devices 308, 310, 312 via the network 300.

In some embodiments, an alarm device 302 outputs a haptic effect via a specific notification device 308. For example, the alarm device 302 may comprise an alarm clock. In some embodiments, the alarm device 302 may be configured to wake up a particular user at a predetermined time (e.g., 7:00 AM). At the predetermined time, the alarm device 302 may transmit a signal to the notification device 308 configured to cause the notification device 308 to output, e.g., a pulsed vibration. In some embodiments, this may allow the alarm device 302 to notify a particular user of an event, without notifying other users of the event. For example, two people may each be wearing a notification device 308, 310 and sleeping next to each other in bed. In some embodiments, the alarm device 302 may transmit a signal to one notification device 308 but not the other notification device 310, thereby waking up one person without waking up the other person. This may be advantageous, for example, if the two people have different work schedules.

In some embodiments, an alarm device 304 outputs haptic effects via a group of notification devices 308, 310. The group may consist of a subset of all of the available notification devices 308, 310, 312 through which the alarm device 304 can output haptic effects. For example, if there are five notification devices through which an alarm device 304 can output haptic effects, the group may consist of three of the notification devices 308, 310, 312.

As a particular example, in some embodiments, the alarm device 304 comprises an appliance, such as a laundry machine. The alarm device 304 may be in a home consisting of, e.g., three people (e.g., two parents and one child). Each person may be associated with a different notification device 308, 310, 312. In some embodiments, the alarm device 304 may determine that an event occurred (e.g., a laundry cycle completed) and transmit a signal to two of the notification devices 308, 310. In one embodiment, the two notification devices 308, 310 are associated with the parents in a household. The notification devices 308, 310 may receive the signal and output a haptic effect (e.g., a low-magnitude vibration). Thus, the alarm device 304 may be able to haptically notify a subset of the available users that an event occurred.

In some embodiments, an alarm device 304 outputs haptic effects via one or more notification devices 308, 310, 312 that are within a radius (e.g., 10 feet) of the alarm device 304. For example, the alarm device 304 may comprise a laundry dryer. Upon the occurrence of an event (e.g., the drying cycle finishing), the alarm device 304 may output a haptic effect via the notification device 308 closest to the alarm device 304. For example, the alarm device 304 may output a haptic effect via notification device 308 if it is closer to the alarm device 304 than the notification device 310. In one embodiment, the alarm device 304 compares GPS data from each of a plurality of notification devices 308, 310, 312 to determine which of the plurality of notification devices 308, 310, 312 is the closest. By notifying users within a radius of the alarm device 304 of the event, the users may be able to take quicker action with respect to the event. For example, by notifying the closest user to a dryer that the dryer cycle is complete, the user may be able to fold the laundry while it is still warm.

In some embodiments, an alarm device 304 outputs haptic effects via one or more notification devices 308, 310, 312 based on an "alert profile." The alarm devices 302, 304, 306 and/or the notification devices 308, 310, 312 may store "alert profiles" in which a user can determine and save in memory a "profile" of the alerts (e.g., kinds of alerts) that the user would like to receive. For instance, the user may input into a notification device 308 that the user would like to receive alerts associated with alarm device 302 (e.g., an alarm clock) and alarm device 306 (e.g., a fire alarm), but not alerts from alarm device 304 (e.g., an appliance). In some embodiments, upon the occurrence of an event, an alarm device 304 may consult with the alert profile and determine whether to transmit a signal to a particular notification device 308 (e.g., a notification device 308 associated with the user). In other embodiments, upon the occurrence of an event, an alarm device 304 may transmit a signal to all available notification devices 308, 310, 312. Each of the notification devices 308, 310, 312 may receive the signal and consult an alert profile (e.g., input by an associated user) to determine whether to output a haptic effect based on the signal.

In some embodiments, an alarm device 302 outputs haptic effects via one or more notification devices 308, 310, 312 based on user preference. For example, users may be able to associate particular haptic effects with particular events, e.g., in a haptic profile. In some embodiments, upon the occurrence of an event, an alarm device 304 and/or a notification device 308 associated with the user may consult the user's haptic profile to determine an associated haptic effect. In one embodiment, a user may have associated a haptic effect comprising a pulsed vibration with an event comprising an alarm clock going off. In such an embodiment, upon the alarm clock going off, the alarm device 302 may transmit a signal to a notification device that is configured to cause the notification device to output a pulsed vibration.

In some embodiments, an alarm device 304 outputs haptic effects via one or more notification devices 308, 310, 312 based on a characteristic of a user (e.g., age, gender, height, hearing capacity, or capacity to see) associated with each of the notification devices 308, 310, 312. Users may be able to input these characteristics into their notification devices 308, 310, 312. For example, in one embodiment, an alarm device 304 may comprise a potentially dangerous object, such as a circuit breaker box (e.g., in a home). Upon an event occurring (e.g., upon an electrical short occurring or a breaker switching), the alarm device 304 may transmit signals to notification devices 308, 310 associated with users with a particular characteristic, e.g., users over the age of 16. This may, for example, reduce the risk of certain individuals (e.g., younger children) manipulating the potentially dangerous object (e.g., attempting to fix the breaker box).

As another example, in some embodiments, the alarm device 304 may output haptic effects via notification devices 308, 310, 312 associated with users that are, e.g., hearing and/or visually impaired in an amount over a threshold. For example, users may be able to input whether, and to what degree, the user is hearing and/or visually impaired. In some embodiments, upon an event occurring (e.g., detecting smoke or a fire), the alarm device 304 may transmit signals to one or more notification devices 308, 310, 312 associated with users that have a hearing and/or visual impairment in an amount above a threshold (e.g., no hearing impairment, medium hearing impairment, high hearing impairment). For example, in some embodiments, the alarm device 304 may transmit signals to notification devices 308, 310, 312 associated with users that have any level of visual or hearing impairment. This may notify such users of the event additionally or alternatively to visual and/or auditory alerts.

In some embodiments, an alarm device 306 may output haptic effects via all of the available notification devices 308, 310, 312. In one such embodiment, the alarm device 306 comprises a fire alarm. Upon the occurrence of an event (e.g., detecting a fire), the alarm device 306 may transmit a signal to all available notification devices 308, 310, 312. For example, the alarm device 306 may transmit a signal to every notification device 308, 310, 312 connected to a particular network 300 (e.g., a local area network, such as a home LAN network). This may alert everyone within a particular radius (e.g., within a home) of the alarm device 306 that the event occurred.

As another example, in some embodiments, the alarm device 306 may transmit a signal to remote users via the Internet. In one embodiment, the alarm device 306 may transmit a signal via the Internet to a notification device 310 associated with, e.g., the police, the fire department, or an ambulance. For example, if the alarm device 306 comprises a smoke detector, the alarm device 306 may be configured to transmit a signal to a notification device 310 associated with the fire department upon detecting smoke. As another example, if the alarm device 306 comprises a burglar alarm in a location (e.g., a home, warehouse, building, or office), the alarm device 306 may be configured to transmit a signal via the Internet to a notification device 310 associated with the owner of the location and/or the police upon detecting an intruder. In this manner, an alarm device 306 can notify remote users of events.

In some embodiments, a first notification device 312 may transmit signals configured to cause one or more other notification devices 308, 310 to output a haptic effect. For example, a first notification device 312 may be connected to network 300. A second notification device 310 may be, e.g., out of range of the network 300 and unable to connect to network 300. In some embodiments, an alarm device 302 may transmit a signal to a first notification device 312. The first notification device 312 may receive the signal and transmit an associated signal (e.g., via Bluetooth or another network) to the second notification device 310. The second notification device 310 may receive the signal from the first notification device 312 and output a haptic effect. In this manner, notification devices 308, 310, 312 can act as intermediaries between themselves and alarm devices 302, 304, 306. Any number or combination of notification devices 308, 310, 312 may act as intermediaries for transmitting signals from any number of alarm devices 302, 304, 306 to a destination.

In some embodiments, the notification device 310 outputs data on a display and/or sounds additionally or alternatively to a haptic effect. For example, the notification device 310 may receive a signal associated with an alarm device 306 detecting, e.g., high levels of carbon monoxide. Based on the signal, the notification device 310 may output text, an image, and/or a sound. For example, the notification device 310 may output "HIGH CO LEVEL" in red, bold text on a display and output a series of beeps. The notification device 310 may also output a haptic effect comprising, e.g., a high-magnitude vibration.

Illustrative Methods for Haptically-Enabled Alarms

Figure 4:
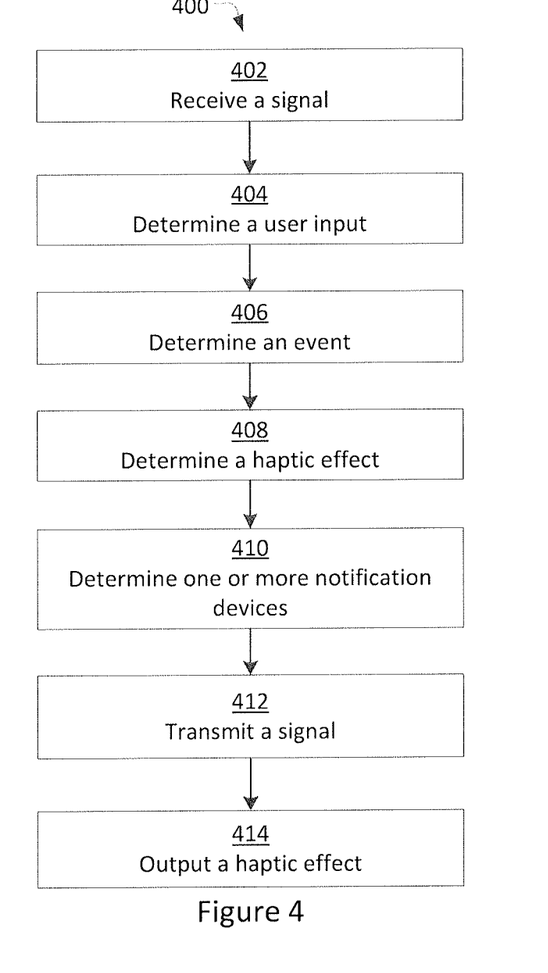
FIG. 4 is a flow chart of steps for performing a method for providing haptically-enabled alarms according to one embodiment.

FIG. 4 is a flow chart of steps for performing a method for providing haptically-enabled alarms according to one embodiment. In some embodiments, the steps in FIG. 4 may be implemented in program code that is executed by a processor, for example, the processor in a general purpose computer, a mobile device, or a server. In some embodiments, these steps may be implemented by a group of processors. In some embodiments one or more steps shown in FIG. 4 may be omitted or performed in a different order. Similarly, in some embodiments, additional steps not shown in FIG. 4 may also be performed. The steps below are described with reference to components described above with regard to computing device 201 shown in FIG. 2.

The method 400 begins at step 402 when the processor 202 receives a signal. In some embodiments, the processor 202 may receive the signal from an alarm device. For example, the computing device 201 may act as an intermediary between the alarm device and a notification device. In such an embodiment, upon the occurrence of an event, an alarm device may transmit a signal (e.g., via a wired or wireless interface) associated with the event to the computing device 201. The computing device 201 may receive the signal (e.g., via network 210) and transmit the signal to the processor 202.

In some embodiments, the processor 202 receives the signal from a notification device. For example, multiple notification devices may act as a chain of intermediaries between an alarm device and the computing device 201. In such an embodiment, the alarm device may transmit a signal to a first intermediary notification device. The first intermediary notification device may receive the signal and transmit another signal to another intermediary notification device. This process may repeat until an intermediary notification device ultimately transmits a signal to the computing device 201. The computing device 201 may receive the signal from the intermediary computing device and transmit the signal to the processor 202.

In some embodiments, the processor 202 receives the signal from the sensors 230. The signal may comprise data associated with an event. For example, in one embodiment, the data may comprise thermometer data or an amount of ambient light. A high temperature, or a reduced amount of ambient light (e.g., from smoke) may be, e.g., indicative of a fire.

In some embodiments, the processor 202 receives the signal from a user interface device (e.g., a button, switch, joystick, or touch-sensitive surface 216), e.g., via I/O components 212. For example, the computing device 201 may comprise a microwave. The computing device 201 may comprise one or more buttons. Upon a user interacting with a button (e.g., a start button to begin microwaving food), the processor 202 may receive a signal associated with the user interaction, e.g., from a button.

The method 400 continues at step 404 when the processor 202 determines a user input. The processor 202 may determine a characteristic of the user input based on the signal. For example, the computing device 201 may comprise one or more user interface devices. Upon a user interacting with the user interface device, the user interface device may transmit a signal associated with the user interaction to the processor 202. The processor 202 may analyze the signal to determine a characteristic (e.g., a type, location, direction, speed, pressure, or gesture) associated with the user interaction.

For example, in some embodiments, the computing device 201 may comprise a touch-sensitive surface 216. Upon a user interacting with the touch-sensitive surface 216 (e.g., at a location associated with a virtual button), the touch sensor 208 may transmit a signal to the processor 202. In some embodiments, the processor 202 analyzes the signal from the touch sensor 208 to determine a location on the touch-sensitive surface associated with the user interaction. For example, if virtual buttons output on a display are mapped to locations on the touch-sensitive surface 216, the processor 202 may analyze the signal from the touch sensor 208 to determine if the user interacted with a virtual button. In some embodiments, the processor 202 analyzes the signal from the touch sensor 208 to determine whether the user performed a gesture (e.g., a swipe or two-finger pinch) on the surface of the touch-sensitive surface 216. For example, the processor 202 may analyze the direction, speed, and/or location associated with the user interaction to determine whether (and which) gesture the user performed.

In some embodiments, the computing device 201 comprises one or more buttons or switches. Upon a user interacting with (e.g., pressing or switching) the one or buttons or switches, the one or more buttons or switches may transmit a signal to the processor 202. In such an embodiment, each button and/or switch may be configured to transmit a different signal to the processor 202. The processor 202 may receive a signal and determine, based on the characteristics of the signal, the button and/or switch with which the user interacted.

The method 400 continues at step 406 when the processor 202 determines an event. The processor 202 may determine the event based on the signal. In some embodiments, the signal is from one or more sensors 230. For example, the sensor 230 may comprise a motion sensor (e.g., for a burglar alarm). Upon detecting motion, the sensor 230 may transmit a signal to the processor 202. The processor 202 may analyze the characteristics of the signal (e.g., an amount, direction, or velocity of the motion) to determine, e.g., whether there is an intruder. In some embodiments, the presence of an intruder comprises the event. As another example, the sensor 230 may comprise an electrical component, such as a 555 timer. Upon counting up or down to a specific time or number, the sensor 230 may transmit a signal to the processor 202. The processor 202 may receive the signal and determine that an event occurred.

In some embodiments, the signal is from an alarm device and/or a notification device. For example, the processor 202 may receive a signal from an alarm device and/or a notification device. The processor 202 may analyze the characteristics of the signal (e.g., the magnitude, frequency, duration, or data associated with the signal) to determine if an event occurred. For example, an alarm device may transmit a digital signal to the processor 202 in which the word "FIRE" is digitally encoded. The processor 202 may determine, based on the digital signal, that an event comprising detecting a fire occurred.

In some embodiments, the processor 202 determines the event based on an algorithm and/or data in a lookup table, e.g., stored in memory 204. For example, the lookup table may comprise characteristics of signals (e.g., from sensor 230, an alarm device, and/or a notification device) and events. In some embodiments, the processor 202 may consult the lookup table to determine an event based on the characteristics of a signal. For example, the processor 202 may consult a lookup table and determine an event comprising an oven being preheated based on a high-magnitude, high-frequency signal from an alarm device.

In some embodiments, the processor 202 determines the event based on the user input. In such an embodiment, the processor 202 may determine the event based on a time associated with the user input. For example, if the user input comprises setting an alarm time on an alarm clock, the processor 202 may determine an event occurred at the alarm time. In some embodiments, the processor 202 determines the event based on a particular task associated with the user input. For example, the computing device 201 may comprise a laundry machine. In such an embodiment, if the user input comprises pressing a user interface device to begin a laundry cycle, the event may comprise the laundry cycle completing.

The method 400 continues at step 408 when the processor 202 determines a haptic effect. As discussed above, in some embodiments, the processor 202 determines a haptic effect based on a characteristic (e.g., the type, importance, or time) of the event. For example, the processor 202 may determine that an event comprising a fire is more important than an event comprising the dishwasher finishing a cleaning cycle. Thus, in some embodiments, the processor 202 may output a haptic effect comprising a higher-magnitude vibration associated with the fire event than with the dishwasher event. In other embodiments, the processor 202 may output a haptic effect associated with the more important event in place of a haptic effect associated with a less important event. For example, the processor 202 may output a haptic effect associated with a fire event in place of a haptic effect associated with a dishwasher event (e.g., if both events occur substantially simultaneously).

As another example, the processor 202 may output a haptic effect associated with any events occurring during a certain period of time (e.g., between 8:00 AM and 10:00 PM). In some embodiments, the user may input the period of time and/or the processor 202 can determine the period of time. For example, the processor 202 may determine the period of time based on signals from a sensor 230 (e.g., a biosensor, which may detect whether a user is asleep or awake), a user's sleep history (e.g., which the processor 202 may learn over time based on user input or signals from a sensor 230), and/or one or more algorithms. The processor 202 may not output haptic effects for events occurring outside that period of time (or occurring during within a different time). This may, for example, prevent the computing device 201 from waking up a user during the night as a result of an event.

In some embodiments, the processor 202 may consult with the user's haptic profile to determine which haptic effect to generate. For example, the user's haptic profile may associate an event comprising detecting that a carbon monoxide level (e.g., within the user's home) is above a threshold with a haptic effect comprising a pulsed, high-magnitude vibration. In such an embodiment, in response to the processor 202 detecting that a carbon monoxide level is above the threshold, the processor 202 may determine a haptic effect comprising a pulsed, high-magnitude vibration.

In some embodiments, the processor 202 determines a haptic effect based on a position of the computing device 201. For example, in some embodiments, the processor 202 determines a haptic effect based on a position of the computing device 201 with respect to an alarm device. In one such embodiment, as the distance between the computing device 201 and the alarm device increases, the processor 202 may determine a haptic effect comprising a decreasing magnitude. As the distance between the computing device 201 and the alarm device decreases, the processor 202 may determine a haptic effect comprising an increasing magnitude. Thus, in some embodiments, the computing device 201 may provide more powerful haptic effects to users closer to the alarm device. This may be advantageous, for example, if the event requires user input or action with respect to the alarm device.

In some embodiments, the processor 202 determines a plurality of haptic effects. Each of the plurality of haptic effects may be associated with a different characteristic of the event. For example, the processor 202 may determine a haptic effect associated with the importance of the event (e.g., a long-duration vibration, which may be configured to indicate that the event is very important). The processor 202 may also determine a haptic effect associated with the type of the event (e.g., a number of pulsed vibrations associated with the type of the event). Based on the plurality of haptic effects, the user may be able to determine multiple characteristics of the event (e.g., that the event is important and what type of event it is).

In some embodiments, the processor 202 determines that a specific haptic effect has a higher priority than another haptic effect, and thus to output only the high priority effect. For example, in the above importance and type of the event example, the processor 202 may determine that the haptic effect associated with the importance of the event has a higher priority than other effects (e.g., the haptic effect associated with the type of the event), and thus output only the importance haptic effect. Alternatively, the processor 202 may determine that only the most intense effect should be output. Thus, in some embodiments, the processor 202 may determine a low intensity vibration and a high intensity vibration, but output only the high intensity vibration.

In some embodiments, the processor 202 determines a haptic effect based on a characteristic (e.g., the type or location) of the alarm device and/or notification device from which the signal was transmitted. For example, the processor 202 may determine that signals from a fire alarm are more important than signals from an appliance. Thus, the processor 202 may determine a haptic effect comprising a high-magnitude vibration if the signal was transmitted from a fire alarm. The processor 202 may determine a haptic effect comprising a low-magnitude vibration, or no haptic effect, if the signal was transmitted from an appliance.

The method 400 continues at step 410 when the processor 202 determines one or more notification devices (e.g., to use to output the haptic effect) to use to output the haptic effect. In some embodiments, the processor 202 determines the one or more notification devices based on proximity. For example, the processor 202 may receive GPS data from the one or more notification devices. The processor 202 may also determine the location of the computing device 201 based on GPS data from sensor 230. In some embodiments, the processor 202 may compare the GPS data from the notification devices to the location of the computing device 201 to determine which notification devices are within a particular distance (e.g., 50 feet) of the computing device 201. In some embodiments, the processor 202 may determine that notification devices within the particular distance should be used to output the haptic effect. In other embodiments, the processor 202 may determine that notification devices outside of the particular distance should be used to output the haptic effect.

In some embodiments, the processor 202 determines a notification device based on user input. For example, before or after beginning a task (e.g., a dishwashing cycle) using the computing device 201, a user may input an identifier (e.g., an identifier of the user, such as a name, gender, or a username, or an identifier of the user's notification device, such as an IP address or RFID tag code) using a user interface device (e.g., a touch-screen display, buttons, a keyboard, or a keypad). The processor 202 may receive signals from the user interface device and associate the identifier with the task. Upon an event associated with the task occurring (e.g., the dishwashing cycle completing), the processor 202 may use the identifier to determine which notification device should be used to output a haptic effect. For example, if the user input an identifier comprising the user's name, the processor 202 may consult a lookup table and determine an IP address of a notification device associated with the user's name.

In some embodiments, the processor 202 determines a user and/or notification device associated with an event based on signals from sensor 230. For example, in some embodiments, the sensor 230 comprises a camera, e.g., oriented to take pictures of users interacting with the computing device 201. In some embodiments, before or after a user initiates a task using the computing device 201, the processor 202 may receive a signal from the sensor 230. The sensor may comprise one or more images associated with the user. The processor 202 may analyze the image(s) to determine which user initiated the task. For example, the processor 202 may perform facial recognition to determine which user initiated a particular task. In some embodiments, the processor 202 may associate the user with the task. Upon an event associated with the task occurring, the processor 202 may output the haptic effect via the user's notification device.

As another example, in some embodiments, the processor 202 uses data from third-party devices to determine one or more notification devices to use to output a haptic effect. For example, in some embodiments, the computing device 201 is a laundry machine. The computing device 201 may comprise a sensor 230 having a RFID tag reader. Multiple users may put articles of clothing into the laundry machine and initiate the laundry cycle. Some of the articles of clothing may comprise RFID tags. In some embodiments, the sensor 230 may read the RFID tags and transmit associated signals to the processor 202. The processor 202 may determine, based on the RFID tag codes, associated notification devices. For example, the processor 202 may consult a lookup table to determine which notification devices are associated with the RFID tag codes. Thus, in some embodiments, the processor 202 may determine a plurality of notification devices, e.g., associated with user's whose laundry is in the laundry machine.

In some embodiments, the processor 202 determines a group of notification devices associated with an event. In such an embodiment, events may be associated with particular groups of notification devices. For example, an event comprising detecting a fire may be associated with all notification devices within a distance (e.g., 50 feet) of the computing device 201. As another example, an event comprising coffee finishing brewing may be associated with the notification devices of, e.g., the parents of a household. As still another example, an event comprising finishing a laundry cycle may be associated with the notification devices of cleaning helpers (e.g., maids). In some embodiments, upon the processor 202 detecting the event, the processor 202 may consult a lookup table to determine one or more associated groups of notification devices.

In some embodiments, the processor 202 determines a notification device based on the severity and/or importance of the event. For example, in some embodiments, if an event has a low importance level (e.g., a refrigerator's ice machine running low on ice), the processor 202 may determine that notification devices within 10 feet of the computing device 201 should be used to output the haptic effect. If an event has a high importance level (e.g., the refrigerator has broken), the processor 202 may determine that all notification devices capable of being alerted should be used to output the haptic effect.

In some embodiments, the processor 202 determines a notification device based on user preference. For example, a user may have a plurality of notification devices (e.g., a smart phone and a watch). In some embodiments, the processor 202 may receive user input (e.g., via a user interface device) configured to associate an event with a particular one of the plurality of notification devices. For example, the processor 202 may receive user input and associate an event comprising detecting an intruder with a notification device comprising the user's smart phone. In this manner, the user may be able to register a particular (e.g., preferred) notification device through which to output haptic effects associated with events.

The method 400 continues at step 412 when the processor 202 transmits a signal. In some embodiments, the processor 202 may transmit a signal to the one or more notification devices. In some embodiments, the signal may be associated with a haptic effect. For example, the signal may be configured to cause the one or more notification devices to output the haptic effect.

In some embodiments, the computing device 201 may transmit the signal directly or indirectly to the one or more notification devices. For example, the computing device 201 may transmit the signal directly to a notification device via, e.g., a Bluetooth interface. As another example, the computing device 201 may transmit the signal indirectly to a notification device via, e.g., the Internet or a network.

In some embodiments, the processor 202 transmits a signal (e.g., a haptic signal) to a haptic output device 218. The processor 202 may be in wired or wireless communication with the haptic output device 218, and thus may transmit the haptic signal via wires or wirelessly. In some embodiments, the signal comprises high-level commands to be interpreted by the haptic output device 218 to generate the haptic effect. In other embodiments, the signal may comprise low-level waveforms configured to directly cause the haptic output device 218 to output the haptic effect.

The method 400 continues at step 414 when the computing device 201 outputs a haptic effect. A haptic output device 218 may receive the signal and output an associated haptic effect. The haptic effect may comprise a texture (e.g., sandy, bumpy, or smooth), a vibration, a change in a perceived coefficient of friction, a change in temperature, a stroking sensation, an electro-tactile effect, or a deformation (e.g., a deformation of a surface associated with the computing device 201). The haptic effect may be configured to notify a user of an event, e.g., associated with an alarm device.

Additionally or alternatively, in some embodiments, the computing device 201 may output a sound and/or information on a display. The sound and/or information may be associated with a characteristic of the event. For example, if the event comprises detecting a fire, the computing device 201 may output the word "FIRE" on a display. The computing device 201 may further, e.g., flash one or more light-sources (e.g., LEDs) and/or output a sound (e.g., a pulsed, high-frequency tone).

Advantages of Haptically-Enabled Alarms

There are numerous advantages to haptically-enabled alarms. Such systems may be able to notify users of events, even if the user is hearing and/or visually impaired. For example, a user may be hearing impaired and asleep in bed. In some embodiments, an alarm device comprising a smoke detector may detect a fire and sound an alarm. Due to the user's hearing impairment, the user may be unable to hear the alarm. However, in some embodiments, the alarm device may further transmit a signal to a notification device worn by the user. The notification device may output a haptic effect (e.g., a stinging sensation). The haptic effect may wake the user, thereby allowing the user to exit the building safely.

In some embodiments, haptically-enabled alarms may provide one or more users with information (e.g., the status of a task) associated with an alarm device. For example, in some embodiments, an alarm device comprising a coffee maker may output a haptic effect via a user's notification device once coffee is finished brewing. This may allow the user to determine that the coffee finished brewing, even if the user is not in the presence of (or within earshot of) the alarm device (e.g., the user is in another room in the user's house). In this manner, haptically-enabled alarms may make it easier or more convenient for the user to use such alarm devices. For example, rather than periodically checking on the alarm device to determine if the alarm device has finished a task (e.g., finished brewing coffee), the user may wait until the user receives a haptic effect indicating the task is finished.

As another example, the alarm device may comprise a refrigerator. The alarm device may output a haptic effect via a user's notification device if, for example, the temperature of the refrigerator exceeds a threshold (e.g., 45 degrees). In some embodiments, this may allow the user to take corrective action (e.g., determine if the refrigerator is broken and fix it), e.g., with respect to the alarm device.

In some embodiments, haptically-enabled alarms may provide one or more users with information associated with an object (e.g., a food item or an article of clothing). For example, in some embodiments, an alarm device comprising a food appliance (e.g., a toaster or an oven) may output a haptic effect via a user's notification device if an object (e.g., toast or a pot-roast) is about to overcook or burn. This may allow the user to intervene and prevent overcooking or burning of the food item, even if the user is not in the presence of (or within earshot of) the alarm device (e.g., the user is in another room in the user's house).

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, in which other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor.

Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computing device comprising:
   a processor configured to:
      receive a signal from a remote alarm-device, wherein the signal identifies a haptic effect to be output, the haptic effect configured to provide a notification of an event detected by the remote alarm-device; and
      in response to the signal received from the remote alarm-device:
         determine the haptic effect based on the signal; and
         transmit a haptic signal configured to cause the haptic effect to be output; and
   a haptic output device in communication with the processor, the haptic output device configured to receive the haptic signal and output the haptic effect.

2. The computing device of claim 1, wherein the remote alarm-device comprises one or more of: a smoke alarm, a fire alarm, a burglar alarm, an alarm clock, or an appliance.

3. The computing device of claim 2, wherein the remote alarm-device comprises the appliance.

4. The computing device of claim 1, wherein the computing device comprises a smartphone, a tablet, an e-reader, a stylus, a pen, or a portable gaming device.

5. The computing device of claim 1, wherein the computing device comprises a ring, a shoe, an armband, a sleeve, a jacket, glasses, a glove, a watch, a wristband, a bracelet, an article of clothing, a hat, a headband, or jewelry.

6. The computing device of claim 1, wherein the event comprises one or more of: detecting a fire, detecting smoke, detecting an in intruder, completing a particular task, detecting whether a temperature exceeds a threshold, a particular time occurring, or detecting an amount of a substance above another threshold.

7. The computing device of claim 1, wherein the haptic effect is based at least in part on a severity or a type of the event.

8. The computing device of claim 1, wherein the remote alarm-device is configured to:
   select a subset of a total number of computing devices to which to transmit the signal; and
   transmit the signal to the subset of the total number of computing devices.

9. The computing device of claim 1, wherein the haptic effect is configured to provide a warning of danger.

10. The computing device of claim 1, wherein the haptic effect comprises a plurality of haptic effects, and wherein each haptic effect of the plurality of haptic effects is configured to convey different information about the event.

11. A method comprising:
   receiving, by a computing device, a signal from a remote alarm-device, wherein the signal identifies a haptic effect to be output, the haptic effect configured to provide a notification of an event detected by the remote alarm-device; and
   in response to the signal from the remote alarm-device:
      determining the haptic effect based on the signal; and
      transmitting a haptic signal configured to cause a haptic output device to output the haptic effect.

12. The method of claim 11, wherein the remote alarm-device comprises one or more of: a smoke alarm, a fire alarm, a burglar alarm, an alarm clock, or an appliance.

13. The method of claim 11, wherein the haptic output device is positioned on the computing device, and the computing device comprises a smartphone, a tablet, an e-reader, a stylus, a pen, a portable gaming device, a ring, a shoe, an armband, a sleeve, a jacket, glasses, a glove, a watch, a wristband, a bracelet, an article of clothing, a hat, a headband, or jewelry.

14. The method of claim 11, wherein the event comprises one or more of: detecting a fire, detecting smoke, detecting an in intruder, completing a particular task, detecting whether a temperature exceeds a threshold, a particular time occurring, or detecting an amount of a sub stance above another threshold.

15. The method of claim 11, wherein the haptic effect is based at least in part on a severity or a type of the event.

16. The method of claim 11, wherein the remote alarm-device is configured to transmit the signal to a subset of a total number of computing devices based on one or more characteristics of one or more users associated with the computing devices in the subset.

17. A non-transient computer readable medium comprising program code, which when executed by a processor is configured to cause the processor to:
   receive a signal from a remote alarm-device, wherein the signal identifies a haptic effect to be output, the haptic effect configured to provide a notification of an event detected by the remote alarm-device; and
   in response to the signal from the remote alarm-device:
      determine the haptic effect based on the signal; and
      transmit a haptic signal configured to cause a haptic output device to output the haptic effect.

18. The non-transient computer readable medium of claim 17, wherein the remote alarm-device comprises one or more of: a smoke alarm, a fire alarm, a burglar alarm, an alarm clock, or an appliance.

19. The non-transient computer readable medium of claim 17, wherein the haptic output device is positioned on a smartphone, a tablet, an e-reader, a stylus, a pen, a portable gaming device, a ring, a shoe, an armband, a sleeve, a jacket, glasses, a glove, a watch, a wristband, a bracelet, an article of clothing, a hat, a headband, or jewelry.

20. The non-transient computer readable medium of claim 17, wherein the event comprises one or more of: detecting a fire, detecting smoke, detecting an in intruder, completing a particular task, detecting whether a temperature exceeds a threshold, a particular time occurring, or detecting an amount of a substance above another threshold.

21. The non-transient computer readable medium of claim 17, wherein the haptic effect is based at least in part on a severity or a type of the event.

\* \* \* \* \*